Sept. 22, 1925.

C. A. PARSONS ET AL 1,554,593

STEAM TURBINE POWER UNIT

Filed June 4, 1923   4 Sheets-Sheet 1

INVENTORS:
CHARLES A. PARSONS,
ALFRED Q. CARNEGIE

By Spear, Middleton, Donaldson & Hall
Attys.

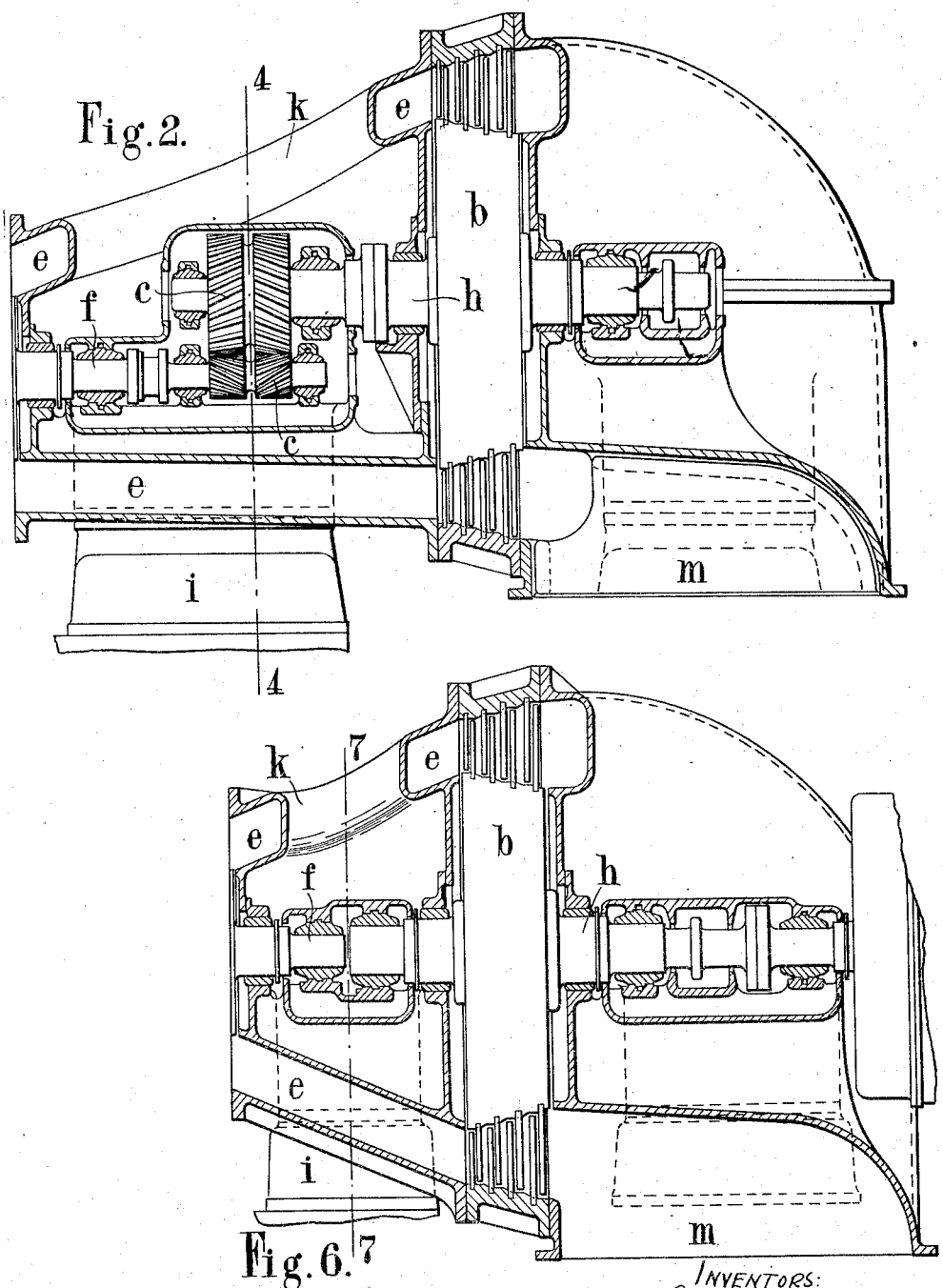

Sept. 22, 1925.

C. A. PARSONS ET AL 1,554,593

STEAM TURBINE POWER UNIT

Filed June 4, 1923

INVENTORS:
CHARLES A. PARSONS,
ALFRED Q. CARNEGIE

Patented Sept. 22, 1925.

1,554,593

UNITED STATES PATENT OFFICE.

CHARLES ALGERNON PARSONS AND ALFRED QUINTIN CARNEGIE, OF NEWCASTLE-ON-TYNE, ENGLAND; SAID CARNEGIE ASSIGNOR TO SAID PARSONS.

STEAM-TURBINE POWER UNIT.

Application filed June 4, 1923. Serial No. 643,399.

*To all whom it may concern:*

Be it known that we, CHARLES ALGERNON PARSONS and ALFRED QUINTIN CARNEGIE, both British subjects, and both residing at Heaton Works, Newcastle-on-Tyne, in the county of Northumberland, England, have invented certain new and useful Improvements in Steam-Turbine Power Units, of which the following is a specification.

This invention relates to steam-power installations having high-pressure and low-pressure turbines and particularly to high-power units of this kind used for driving alternators.

The invention consists in the particular combinations of elements hereinafter described and particularly pointed out in the claims.

Referring to the accompanying drawings, which form part of the specification:—

Figure 1 shows an outside elevation of one form of the invention in which the high-pressure and low-pressure turbine shafts are offset and geared together, Figure 2 being a sectional elevation showing the conical duct and certain adjacent parts to a larger scale, and Figure 3 a corresponding plan, while

Figure 6 is a sectional elevation showing the conical duct and adjacent parts to a larger scale, and Figure 7 a cross-section on the line 7—7 of Figure 6.

Where desirable corresponding parts in the different forms of the invention are indicated in the drawings by the same reference symbols.

In carrying the invention into effect according to one form as illustrated in Figures 1 to 4, a high-speed, high-pressure turbine, $a$, is connected to the low-speed, low-pressure turbine, $b$, by way of gearing, $c$, the whole power so developed serving to drive the alternator, $d$. The exhaust from the high-pressure turbine, $a$, passes through a special duct, $e$, which takes the form of a hollow asymmetrical truncated cone, the generatrices of which are straight lines while the centre of the two base circles lie respectively on the axes of the high-pressure shaft, $f$, and the low-pressure shaft, $h$. These shafts overlap to a certain extent and are off-set in a vertical plane, as shown, in order to accommodate the gearing.

The conical duct, $e$, is supported or partly supported on a pedestal, $i$, and serves as a kind of cage to enclose the gearing and adjacent bearings, which are likewise supported or partly supported on the pedestal, $i$.

An aperture, $k$, is formed in the upper part of this duct to afford access to the gearing and bearings and permit the removal of certain of these parts.

In some cases, the conical duct $e$, may be divided into a number of cells by radial webs, $l$, (see Figure 4) which serve to transmit the load carried by the bearings encaged in the duct to the supporting feet on its outer wall.

The exhaust from the low-pressure turbine which comprises only a small number of rings of blades, passes through the duct, $m$, of well-known form into the condenser, $n$, placed below the turbine.

Figure 1:
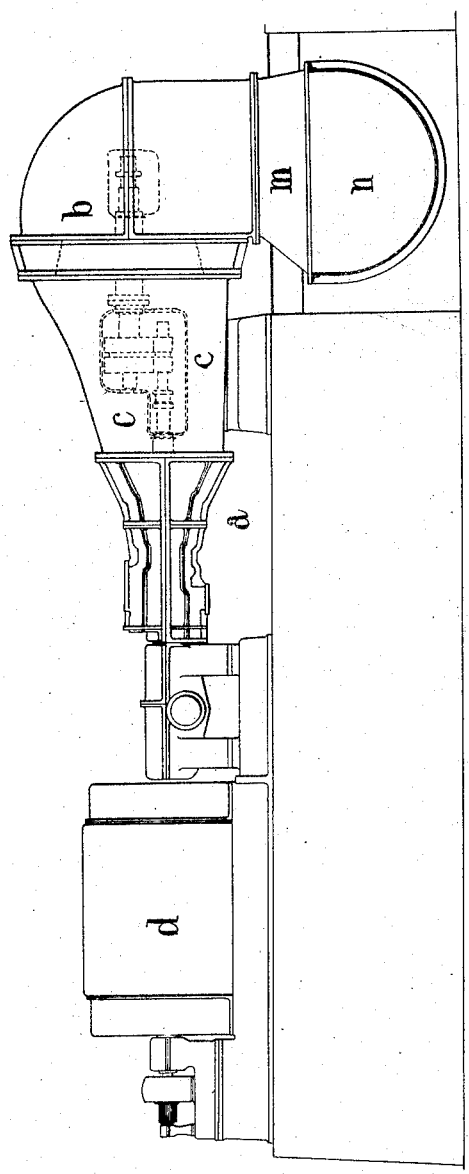
Figure 5:
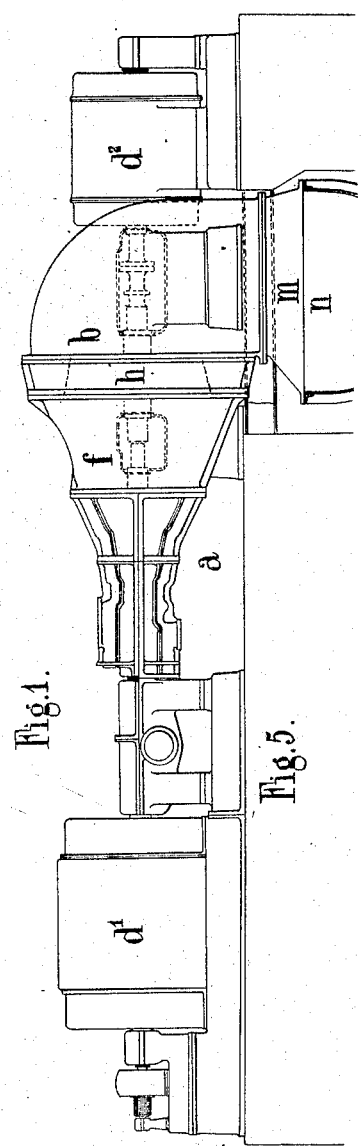
Figure 5 shows an outside elevation of a modification in which the high-pressure and low-pressure turbine shafts are co-axial, while finally
Figure 3:
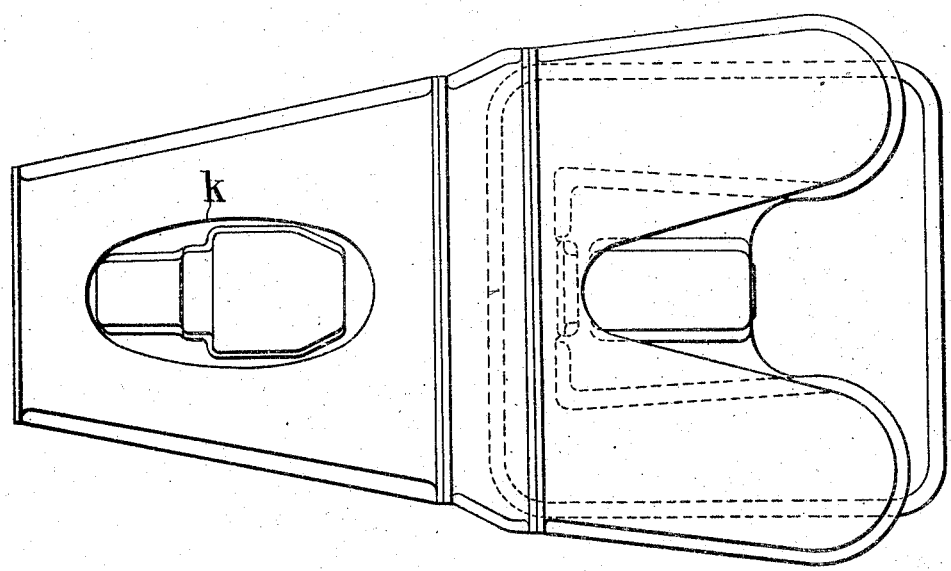
Figure 4:
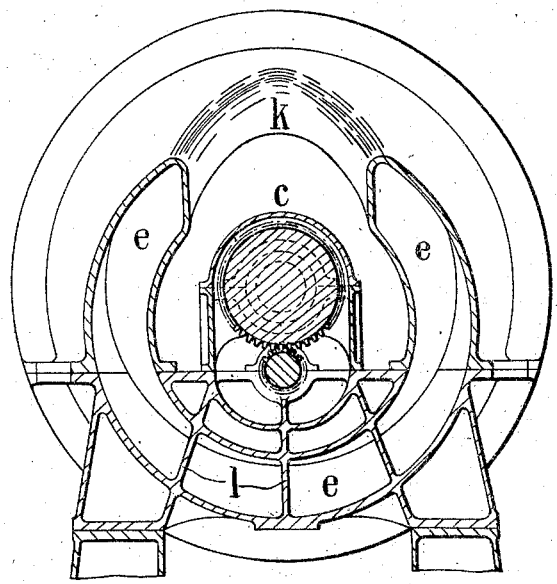
Figure 4 is a cross-section on the line 4—4 of Figure 2.
Figure 7:
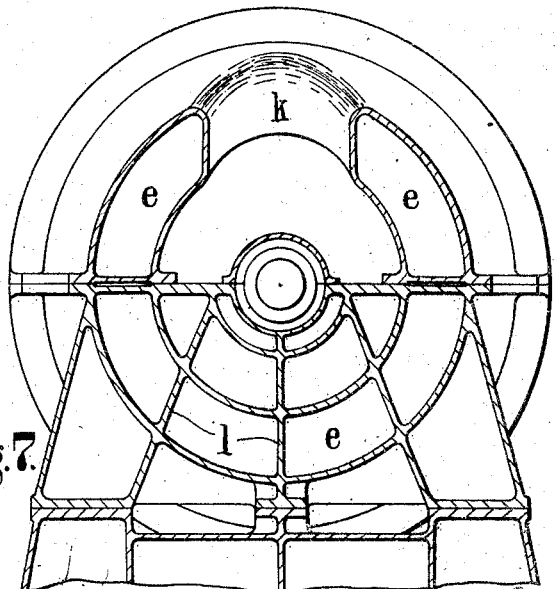

According to a modification of the invention (see Figures 5, 6 and 7) the high-pressure turbine, $a$, developing the bulk of the power as before, drives its own alternator, $d'$, while the low-pressure turbine, $b$, in turn drives a smaller alternator, $d^2$. In this form of the invention the high-speed shaft, $f$, and the low-speed shaft, $h$, may be co-axial, their ends being in juxtaposition as shown, and supported in appropriate bearings encaged within the conical duct, $e$, which in this case takes the form of a truncated right circular cone.

Turbine installations of the kind described and illustrated above have a high thermal efficiency while at the same time the relative arrangement of the conical duct and the parts within it tends to compactness and reduction in weight; in particular, owing to the comparative shortness of the duct connecting the two turbines, mechanical and thermal losses due to the transfer of steam from turbine to turbine are reduced to a minimum.

Having now described our invention, what we claim as new and desire to secure by Letters Patent is:—

1. In combination, turbines arranged end to end, said turbines each having a stator casing and a rotor member disposed therewithin; duct means in rigid association with adjacent stator casings for leading working fluid from one of said casings to the next and bearings for said rotor members encaged within said duct means.

2. In combination, turbines arranged end to end, said turbines each having a stator casing and a rotor member disposed therewithin; duct means in rigid association with adjacent stator casings for leading working fluid from one of said casings to the next; bearings for said rotor members and gearing operatively connecting them, said bearings and gearing being encaged within said duct means.

3. In combination, turbines arranged end to end, said turbines each having a stator casing and a rotor member disposed therewithin; duct means having a conoidal formation in rigid association with adjacent stator casings for leading working fluid from one of said casings to the next and bearings for said rotor members encaged within said conoidal duct means.

4. In combination, turbines arranged end to end, said turbines each having a stator casing and a rotor member disposed therewithin; duct means having a conoidal formation in rigid association with adjacent stator casings for leading working fluid from one of said casings to the next; bearings for said rotor members and gearing operatively connecting them, said bearings and gearing being encaged within said conoidal duct means.

5. In combination, turbines arranged end to end, said turbines each having a stator casing and a rotor mounted on its own separate shaft and conoidal duct means in rigid association with adjacent stator casings for leading working fluid from one of said casings to the next.

6. In combination, turbines arranged end to end, said turbines each having a stator casing and a rotor member disposed therewithin; duct means in rigid association with adjacent stator casings for leading working fluid from one of said casings to the next and bearings for said rotor members encaged within and supported by said duct means.

7. In combination, turbines arranged end to end, said turbines each having a stator casing and a rotor member disposed therewithin; duct means having the form of a conoidal annulus in rigid association with adjacent stator casings for leading working fluid from one of said casings to the next and bearings for said rotor members encaged within said conoidal annulus.

8. In combination, turbines arranged end to end, said turbines each having a stator casing and a rotor member disposed therewithin; duct means having the form of a conoidal annulus in rigid association with adjacent stator casings for leading working fluid from one of said casings to the next; bearings for said rotor members encaged within said duct means and pedestal means for supporting said duct means, an element of said pedestal means extending through said conoidal annulus to the interior thereof to support said bearings.

9. In combination, turbines arranged end to end, said turbines each having a stator casing and a rotor member disposed therewithin; duct means having the form of a conoidal annulus in rigid association with adjacent stator casings for leading working fluid from one of said casings to the next and bearings for said rotor members encaged within said conoidal annulus, said annulus having an aperture through the walls thereof to provide access to said bearings.

In testimony whereof we have signed our names to this specification.

CHARLES ALGERNON PARSONS.
ALFRED QUINTIN CARNEGIE.